No. 656,429. Patented Aug. 21, 1900.
P. C. SOUTHWICK.
BALING PRESS.
(Application filed Sept. 21, 1898.)
(No Model.) 5 Sheets—Sheet 3.
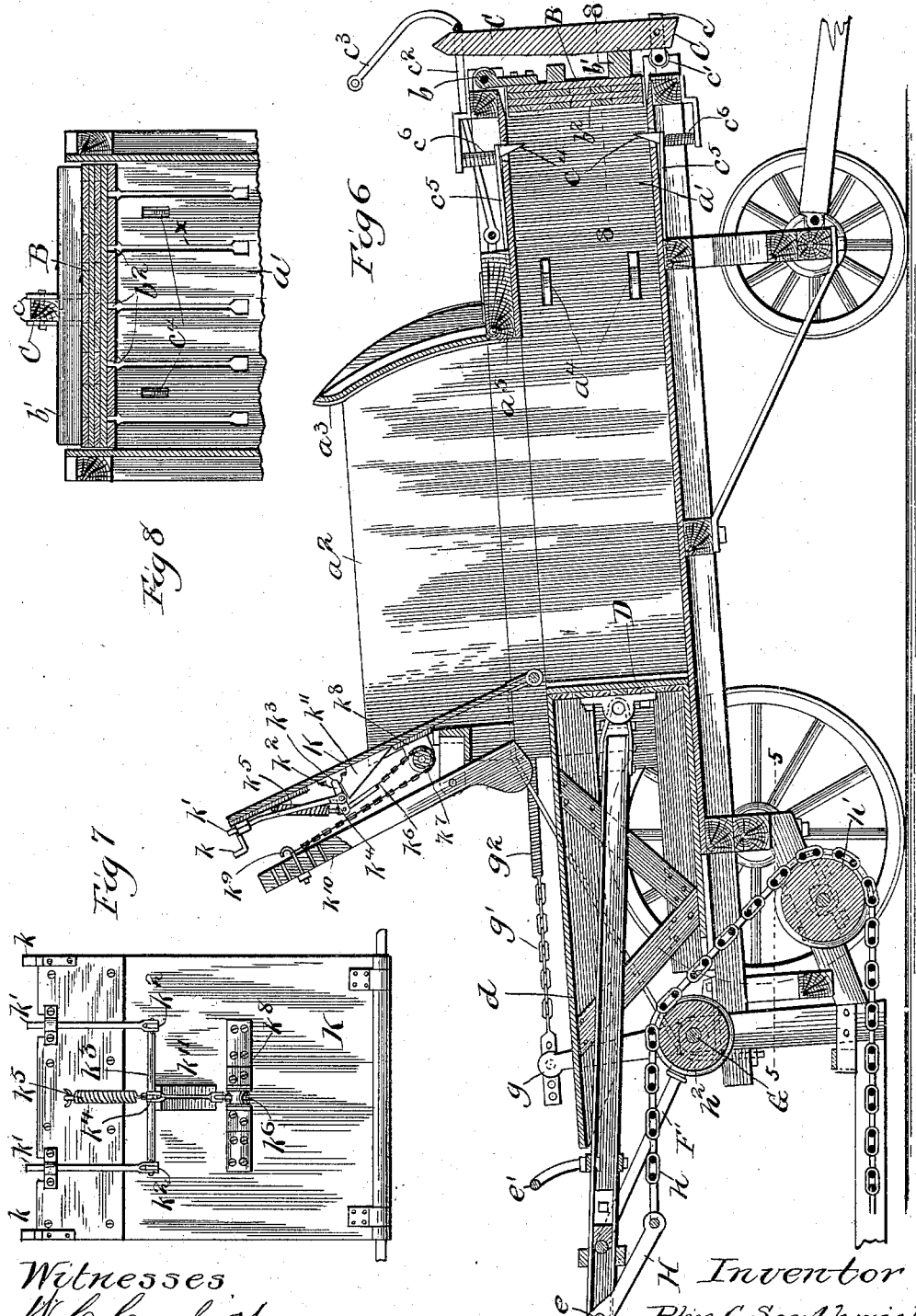

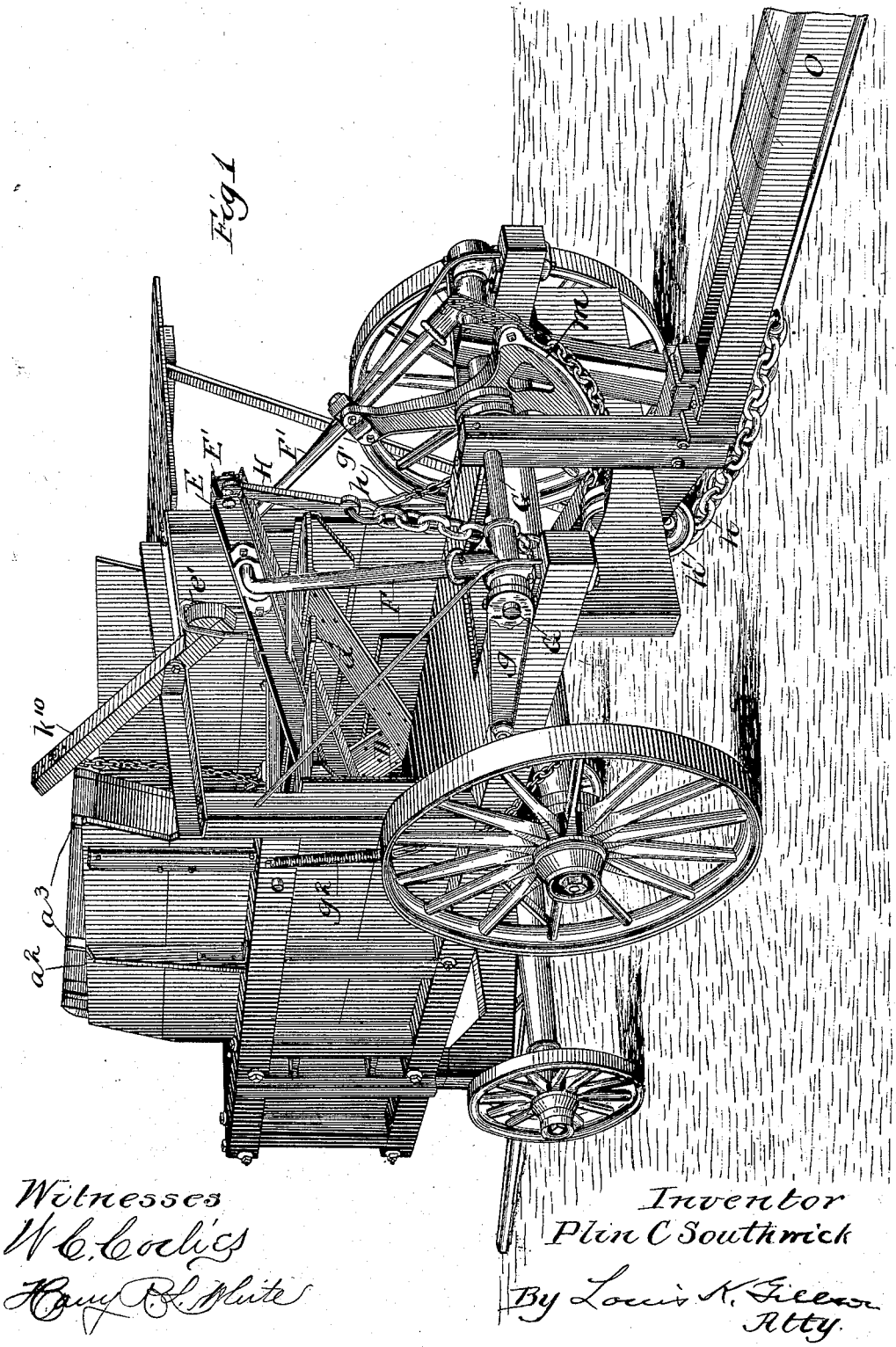

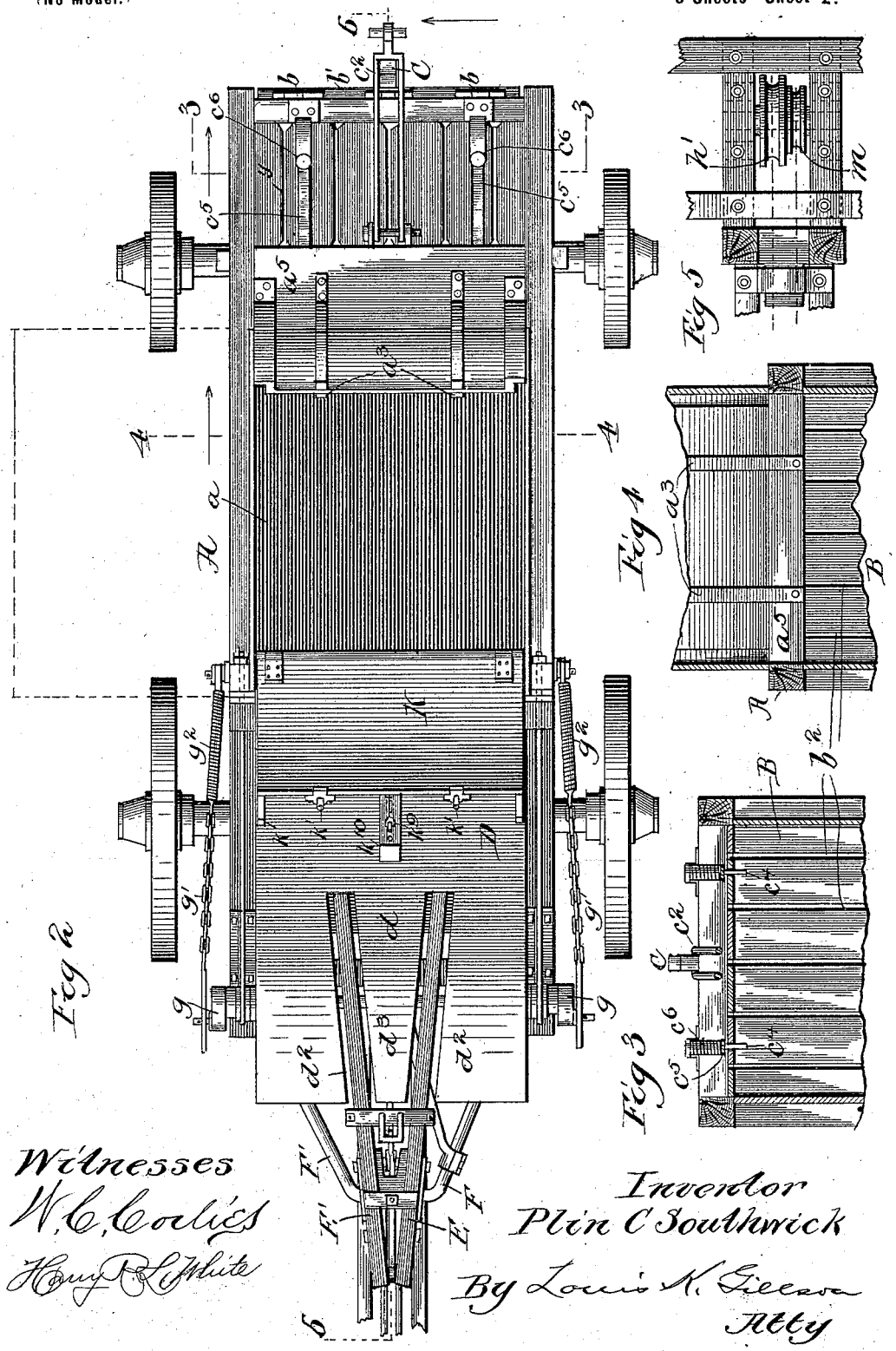

No. 656,429. Patented Aug. 21, 1900.
P. C. SOUTHWICK.
BALING PRESS.
(Application filed Sept. 21, 1898.)
(No Model.) 5 Sheets—Sheet 4.
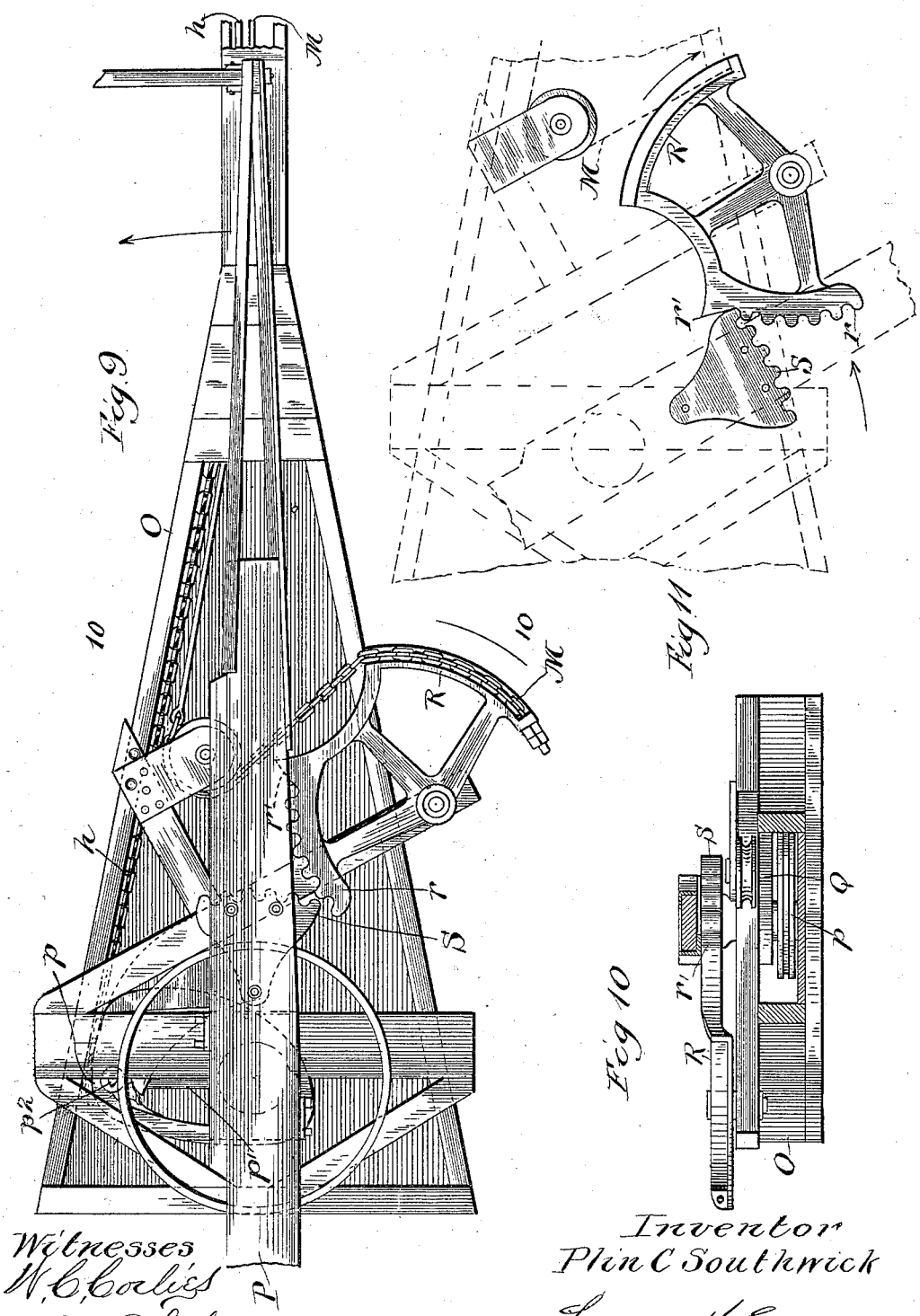
Witnesses
Inventor
Plin C Southwick
By Louis K Gillson
Atty

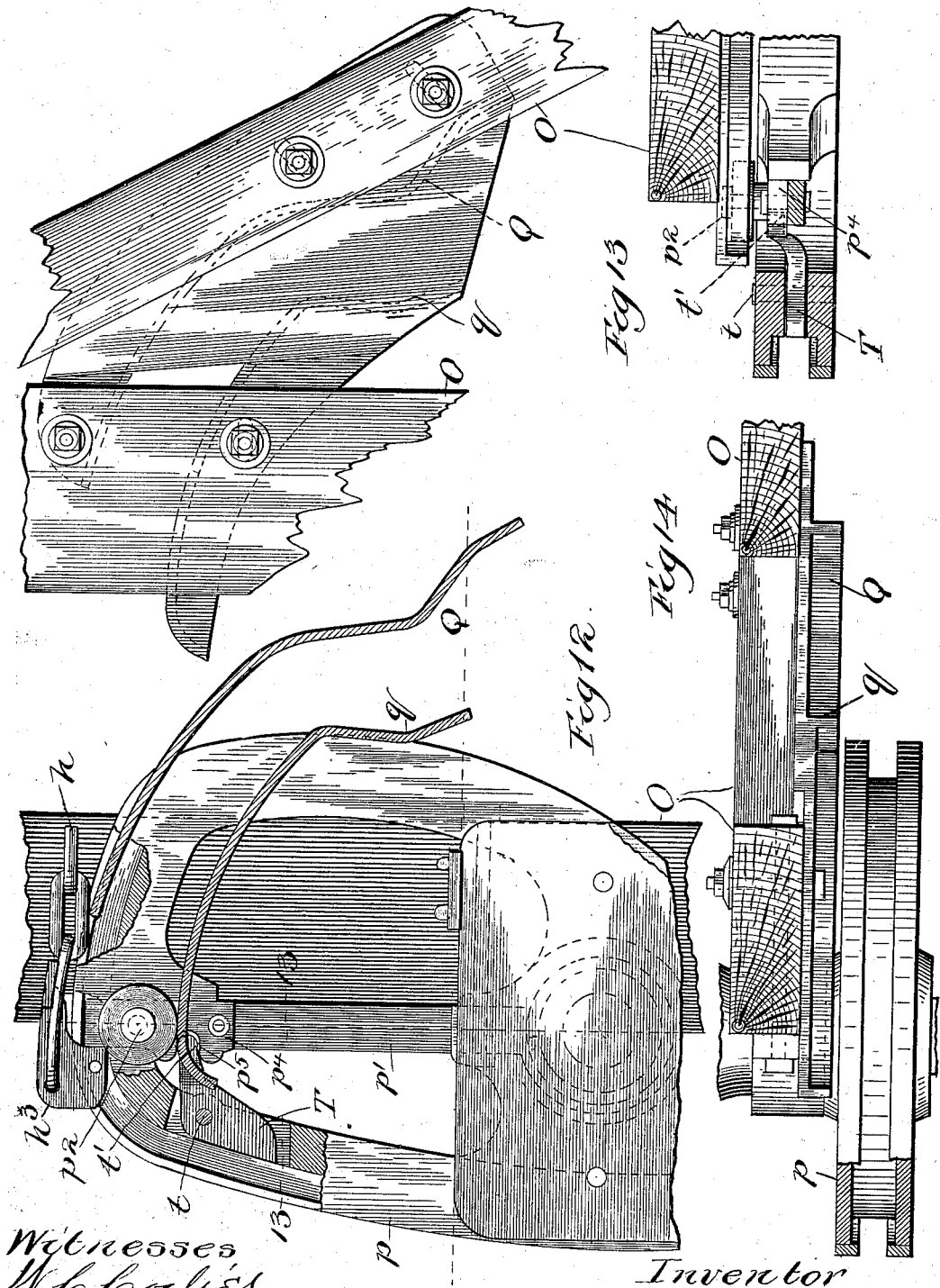

UNITED STATES PATENT OFFICE.

PLIN C. SOUTHWICK, OF SANDWICH, ILLINOIS.

BALING-PRESS.

SPECIFICATION forming part of Letters Patent No. 656,429, dated August 21, 1900.

Application filed September 21, 1898. Serial No. 690,208. (No model.)

*To all whom it may concern:*

Be it known that I, PLIN C. SOUTHWICK, a citizen of the United States of America, and a resident of Sandwich, county of De Kalb, and State of Illinois, have invented certain new and useful Improvements in Baling-Presses, of which the following is a specification, and which are fully illustrated in the accompanying drawings, forming a part thereof.

In the drawings, Figure 1 is a perspective view of the press. Fig. 2 is a plan view of the press. Fig. 3 is a detail section taken on the line 3 3 of Fig. 2. Fig. 4 is a detail section taken on the line 4 4 of Fig. 2. Fig. 5 is a detail plan on the line 5 5 of Fig. 6. Fig. 6 is a vertical longitudinal section taken on the line 6 6 of Fig. 2. Fig. 7 is a detail plan view of the body of the machine. Fig. 8 is a detail plan in section of the swinging door or bulkhead of the baling-chamber, showing grooves for the wires; and Figs. 9, 10, 11, 12, 13, and 14 are details of the power device, Fig. 12 being a sectional view on the line 12 12 of Fig. 11.

This invention relates to portable baling-presses of that type in which pressure is applied to a reciprocating plunger by means of a toggle-joint mechanism; and the invention relates to improvements in various parts of the press and in the power mechanism coöperating therewith.

The objects of the invention are to provide a press of large capacity and capable of substantially-continuous operation; to provide for the baling of the material, such as hay, in such form that the wires may be applied from side to side instead of from end to end; to provide means for the end discharge from a bulkhead-press; to provide improved means for controlling the door for closing the feed-aperture of the compressing-chamber; to provide an improved form of toggle mechanism; to provide improved retracting means, and to improve the power mechanism used in conjunction with presses of this character. These objects are attained by the construction hereinafter fully described and which is illustrated in the drawings.

The body or trunk of the machine is a strong oblong rectangular chest A of greater width than height, having a suitable framing and being open at one end, the other end being closed by an openable bulkhead. The interior of this body is divided into a compression-chamber $a$ and a baling-chamber $a'$, the two being separated merely by the spring-retaining pawls $a^4$ $a^4$, past which the material is forced in the act of compression from the chamber $a$ into the chamber $a'$. A commodious feed-aperture $a^2$ is provided in the top of the body portion of the machine opening to the chamber $a$.

The discharge end, which I characterize as the "front" end of the machine, is closed by means of a bulkhead-door B, hinged across the top to the framing of the body, as shown at $b$, and being lagged out at its lower end by a block $b'$. The door B is locked in its closed position by means of a lever-arm C, pivoted, by means of the link $c$ and the eyebolt $c'$, to the end of the cross-rail of the frame of the body portion, so that it may be swung upwardly to bear against the lagging-block $b'$ and have its upper end caught by a loop $c^2$, swinging from the end cross-beam at the top of the body A, this loop being provided with an upwardly-extending and backwardly-turned handle-bar $c^3$ within easy reach of an operator standing on the top of the machine.

As the completed bale is intended to be discharged by the pressure against it of the next succeeding charge of the material to be compressed, I provide means for holding this new charge after the bale has fallen from the press and until the door B has closed and been secured. Such means consist of the fingers $c^4$, projecting into the chamber $a'$ from above and below and being carried by the spring-plates $c^5 c^5$, secured to the top and bottom of the trunk or body of the machine and being reinforced, if necessary, by spiral springs $c^6 c^6$, reacting against suitable brackets attached to the framing of the machine. The fingers $c^4$ have their front faces slightly beveled, so that the final compression of the material will cause their retraction; the spring, however, controlling them being of sufficient tension to hold the material in place until the bulkhead-door has been secured.

The plunger-head D reciprocates longitudinally in the chamber $a$ and carries a backwardly-projecting framework $d$ in box form, which serves as a suitable guide for the plunger and also as a table for closing the aperture $a^2$ when the plunger is at the end of its instroke, so that material for the next charge may be deposited upon it without waiting for the retraction of the plunger.

The long arm of the toggle is attached to the rearward face of the plunger along its horizontal median line and comprises the two bars, preferably I-beams E E', arranged in V form, their rearward ends converging, so that their forward ends engage the plunger-head D near its side edges. The shorter arm of the toggle comprises the two bars F F', arranged in V form, the apex of the V being pivotally united with the longer arm of the toggle some distance from its rearward end. The two bars F F' of the shorter arm of the toggle are rigidly fixed to a shaft G, journaled in suitable boxes at the rearward ends of the side sills of the body portion of the machine. Crank-arms $g\ g$ are fixed upon the extreme ends of the shaft G and are connected by means of chains $g'$ and coil-springs $g^2$ with the frame of the body portion of the machine, the angular relation of the crank-arms $g\ g$ and the short arm of the toggle and the length of the connecting chains and springs being such that these connecting media are drawn taut as the toggle approaches the limit of its backward movement, so that the springs $g^2$ cushion the outstroke.

Power is applied to the toggle by means of a link H, attached, as shown at $e$, to the apex of the V-shaped long arm—that is to say, the point of attachment is back of the joint of the toggle. A chain $h$ connects the link H with the power mechanism, hereinafter described, and is turned over a sheave $h^2$, running upon the shaft G, so that the initial strain in straightening the toggle is transverse to the short arm of the latter, the chain then passing around a sheave $h'$, suitably journaled below the body A in such position that the direction of the final strain is substantially perpendicular to the straightened toggle.

The feed-door K is pivoted across the rearward side of the aperture $a^2$ and oscillates in and out of the feed-hopper. This door is provided at its outer edge with suitable stop-hooks $k$, adapted to engage the cross-beam $a^5$ of the body portion A at the forward edge of the aperture $a^2$ and to allow the inner face of the door K to come flush with the top of the chamber $a$. Spring-bolts $k'\ k'$ are carried by the door K and adapted to engage suitable sockets in the cross-beam $a^5$, so as to securely lock the door in its closed position. The bolts $k'$ are connected with the crank-arms $k^2$, carried by a rock-shaft $k^3$, suitably journaled across the outer face of the door K, and this shaft is provided with a third crank-arm $k^4$, to which and to the face of the door a spiral spring $k^5$ is attached, so as to normally hold the bolts in their extended position. The retraction of the bolts is accomplished by means of a chain $k^6$ also attached to the crank-arm $k^4$, and after being turned about a sheave $k^7$, journaled in a suitable bracket secured to a frame $k^8$, built up from the body of the machine, is secured, as shown at $k^9$, to the outer end of a lever-arm $k^{10}$, pivoted in a suitable bracket also carried by the frame $k^8$. The retraction of the bolts $k'$ is automatically accomplished by means of a loop $e'$, projecting upwardly from the long arm of the toggle and adapted to engage and depress the short end of the lever $k^{10}$, the first movement of this lever accomplishing the retraction of the bolts and throwing the crank-arm $k^4$ against a block $k^{11}$, standing up from the face of the door immediately back of the rock-shaft $k^3$, so that the further movement of the lever $k^{10}$ lifts the door K. The front wall of the feed-hopper is provided with suitable camways $a^3$, as shown, for the engagement of the ends of the bolts $k'$, forcing them inwardly as the door K descends in order that they may engage the sockets in the cross-beam $a^5$. The retraction of the plunger is accomplished by means of the chain M, leading from the power mechanism and bearing upon the outer face of a cam-segment $m$ and being attached to the latter at its shortest radius. The cam-segment $m$ is mounted upon the shaft G, but eccentrically thereto, so as to move with the short arm of the toggle.

The machine is adapted to be driven by horse-power, and the power comprises a suitable frame O, which, as shown, is approximately V-shaped and upon which is pivoted a draft-pole P. To the pivot-pin of the draft-pole P there is fixed an eccentric cam-block $p$, with which the chain $h$ is periodically engaged and upon the peripheral face of which it is laid as the cam is turned. The engagement of the chain $h$ with the cam $p$ is by means of a hook $h^3$ at the end of the chain and a reciprocating pawl $p'$, adapted to be projected into the path of the hook. The cam-block $p$ is provided with a peripheral T-groove, into which the nose of the hook $h^3$ enters and within which it is retained by means of a suitable cross-pin, as shown. The reciprocation of the pawl $p'$ is accomplished by means of a lateral stud $p^2$, bearing a suitable antifriction-roller and engaging cams Q $q$, fixed to the frame O, and adapted, respectively, to cause the positive retraction and positive extension of the pawl, the cam Q being so placed as to retract the pawl to disengage the chain when the plunger D has reached the limit of its instroke and the cam $q$ being so placed as to cause the positive extension of the pawl in time to reëngage the hook $h^3$. In machines of this type the recoil of the chain when released by the pawl $p'$ is so quick that the hook is apt to be carried past the pawl before the latter can be again extended. To guard against this, I provide a dog T, which is arranged to be thrown into the path of the hook $h^3$ as the pawl $p'$ is retracted and to be withdrawn therefrom as the pawl is again advanced. This mechanism may be variously worked out. As shown, the dog T is substantially in the form of a bellcrank and is pivoted at $t$ within a suitable recess in the frame of the cam $p$, so that its nose will enter the groove within which the hook $h^3$ runs. The heel end $t'$ of the dog T is engaged by the pawl $p'$, and to accomplish this conveniently a plate $p^4$ is secured to the pawl and has a lateral recess $p^5$, into which the end $t'$ of the dog enters. By reason of this engagement of the dog with the pawl the reciprocation of the latter causes the oscillation of the former, the nose of the dog being advanced by the recession of the pawl and withdrawn by its advance. The location of the recess $p^5$ with reference to the forward end of the pawl $p'$ is such that when the pawl is projected into the path of the hook $h^3$ the dog is withdrawn therefrom, and when the pawl is withdrawn from this path the dog is thrown across it. The dog is located at the forward side of the pawl $p'$, so that it stops the hook as it flies back and holds it until the advance of the pawl retracts the dog and allows the hook to move along the groove and engage the pawl.

The retracting-chain M, after being turned over a suitable sheave $m'$, carried by the framing of the body A, leads to and is laid over the peripheral face of an eccentric cam R, pivoted upon the frame of the power, the attachment of the chain to the cam being at the shortest radius of the latter. The cam R is provided with a segmental rack $r$, which intermeshes with a segmental rack S, fixed upon the pole P, and the parts are so disposed that the racks S and $r$ come into engagement immediately after the plunger D has reached the limit of its instroke. As the pole P advances the cam R is moved upon its pivot, so as to draw back the chain M, thereby retracting the plunger. In order to insure a proper engagement of the rack S with the rack $r$, the first tooth $r'$ of the latter projects radially to a considerable distance beyond its mates.

The initial movement in retracting the plunger involves the vertical movement of both members of the toggle, and these members being of very considerable weight more power is required at the commencement of the stroke than at any other portion of it. This is provided for in the eccentric form of cams $m$ R, the initial action of each being by that portion which is at its greatest radius, thereby utilizing the maximum leverage of each cam.

The operation of the press is as follows: The chamber $a$ having been filled with the material to be baled the door K is thrown down, pressure being applied, if necessary, to completely close it. Power is now applied to advance the plunger, and the charge is compressed into the chamber $a'$, the door K being automatically opened by the engagement of the loop $e'$ with the lever $k^{10}$ before the instroke of the plunger is entirely completed, and the feed-hopper is at once filled, the material being crowded down into the chamber $a$ as soon as the plunger recedes, and if the chamber $a$ has not been entirely filled the power may be stopped temporarily. From one to four charges will make a complete bale, depending upon the character of the material and the density to which it is desired to compress the bale. The bale having been completed the plunger is stopped at the end of the last instroke, and wires are inserted from above, being passed downwardly in the groove $b^2$ $b^2$ in the bulkhead-door B and $d'$ in the face of the plunger D, the two ends of each wire being secured together at the bottom of the bale, the floor and roof of the chamber $a'$ being slotted for their accommodation, as shown at $x$ $y$. The loop $c^2$ is now raised, releasing the arm C and allowing it to fall. The power is again applied to the machine, and upon the next advance of the plunger D, a new charge in the meantime having been deposited within the chamber $a$, the completed bale is ejected, the door B being thrown upwardly by the power applied through the plunger. The discharge end of the trunk A is made flaring at the top and bottom, as plainly shown in Fig. 5, in order that the bale may freely drop therefrom. As the bale falls from the machine the charge which has been compressed behind it is held by the fingers $c^4$, and the operator throws upwardly the arm C, the door having fallen as the bale dropped, and makes it fast by means of the loop $c^2$. The bifurcated or V form of the two arms of the toggle firmly brace the parts and strengthen the joint, and the application of this form to the long arm of the toggle makes it possible to use a very wide plunger-head, the danger of the cramping of the plunger by reason of the differing density in the charge being thereby removed. The cushioning-springs $g^2$ prevent injury to the mechanism by reason of the too-rapid descent of the heavy members of the toggle as the limit of the back stroke is reached. By prolonging the long arm of the toggle beyond the joint and applying the power to its rearward end an increase of leverage is secured. The top $d$ of the rearward extension of the plunger is slotted from its rearward end, as shown at $d^2$ $d^2$, for the accommodation of the two members E E' of the long arm of the toggle, and the central tongue $d^3$ between the slots $d^2$ $d^2$ is supported by a suitable brace.

I claim as my invention—

1. In a baling-press, the combination with a trunk inclosing a baling-chamber, and having an openable bulkhead at its end, of means for compressing the material against the resistance of the bulkhead, and yielding detents for retarding the advance of the forming bale upon the discharge of a completed bale.

2. In a baling-press, the combination with a horizontal trunk inclosing a baling-chamber and having a lateral feed-aperture, of a removable bulkhead at the end of the baling-chamber, and spring-extended fingers projecting laterally into the baling-chamber for yieldingly resisting the advance of the forming bale.

3. In a baling-press, the combination with a trunk, a plunger reciprocating within the trunk, a toggle for actuating the plunger, and a rock-shaft for carrying the short arm of the toggle and being in fixed relation therewith, of a pair of crank-arms fixed upon the rock-shaft, and cushioning-springs connecting the crank-arms with the trunk.

4. In a baling-press, the combination with a trunk having a lateral feed-aperture, and with a plunger and pitman reciprocating within the trunk, of a door for the aperture, a rocking lever pivoted to the trunk back of the door-hinges, a flexible connection between the outer end of the lever and the door, and a loop rising from the pitman for engaging the lower end of the lever and rocking it upon its pivot as the plunger advances.

5. In a baling-press, the combination with a reciprocating plunger and a toggle for actuating it, of an oscillating cam fixed to the short arm of the toggle and having a face eccentric to its center of oscillation, a chain attached to the cam at its short radius and being laid over its eccentric face, and means for applying power to the chain to oscillate the cam for flexing the toggle.

6. In a baling-press, the combination with a reciprocating plunger and a toggle for actuating it, of an oscillating cam fixed to the short arm of the toggle and having a face eccentric to the center of its movement, a chain for retracting the plunger fixed to the cam at its short radius and being laid over its eccentric face, a rotative power mechanism, an oscillating cam mounted on the frame of the power and having a face eccentric to the center of its movement, the remote end of the chain being attached to the last-named cam at its short radius, and being laid over its eccentric face, and means for intermittently connecting the rotative parts of the power with the last-named cam to oscillate it.

7. In a baling-press having a reciprocating plunger and a toggle for actuating the same, of a rotative power mechanism for actuating the toggle, a chain for connecting the power with the toggle, an eccentric cam carried by the shaft of the power, a single-acting pawl carried by the cam for intermittently engaging the chain, and fixed cams for positively retracting and projecting the pawl to disconnect and reconnect it with the chain.

8. In a power mechanism, the combination with a rotatable cam-hook, a single-acting reciprocating pawl carried by the hook, and a power-transmitting chain or the like adapted for alternate engagement and release by the pawl, of a dog for arresting the chain when released by the pawl.

9. In a power mechanism, the combination with a rotatable cam-hook, a single-acting reciprocating pawl adapted to play in and out across the periphery of the cam, and with a chain or the like for transmitting power and having an engaging hook in sliding engagement with the periphery of the cam, of a dog for arresting the engaging hook when released by the pawl, and means for advancing and retracting the dog.

10. In a power mechanism, the combination with a rotatable cam-hook, a power-transmitting hook in sliding engagement with the periphery of the cam, and a pawl, of a dog, and means for advancing the pawl and the dog into and withdrawing them from the path of the hook in alternation.

11. In a power mechanism, the combination with a rotatable cam having a peripheral groove, a power-transmitting engaging hook running within the groove, and a pawl reciprocating into and out of the groove, of a dog pivoted to the cam so that its nose may be thrown into the groove, the heel end of the dog being in engagement with the pawl, whereby the movement of the pawl throws the dog in the opposite direction.

12. In a power mechanism, in combination, a rotatable cam-hook, a hook in sliding engagement with the periphery of the cam, a pawl carried by the cam and having a reciprocating movement across the path thereon of the hook once each rotation of the cam, a dog adapted to be thrown into the path of the hook as the pawl is retracted, and to be withdrawn therefrom as the pawl is extended.

PLIN C. SOUTHWICK.

Witnesses:
LOUIS K. GILLSON,
FREDERICK C. GOODWIN.